(12) United States Patent
Xu et al.

(10) Patent No.: US 12,203,448 B2
(45) Date of Patent: Jan. 21, 2025

(54) WIND FARM LAYOUT AND YAW CONTROL METHOD AND ELECTRONIC DEVICE

(71) Applicant: Tianjin University, Tianjin (CN)

(72) Inventors: Xiandong Xu, Tianjin (CN); Guohao Li, Tianjin (CN); Yuze Zhao, Tianjin (CN); Changpeng Song, Tianjin (CN); Lidong Zhang, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 18/358,055

(22) Filed: Jul. 25, 2023

(65) Prior Publication Data

US 2024/0200534 A1 Jun. 20, 2024

(30) Foreign Application Priority Data

Dec. 15, 2022 (CN) .......................... 202211615132.6

(51) Int. Cl.
*F03D 7/04* (2006.01)

(52) U.S. Cl.
CPC ............ *F03D 7/045* (2013.01); *F03D 7/049* (2023.08); *F05B 2260/84* (2013.01); *F05B 2270/204* (2020.08); *F05B 2270/321* (2013.01)

(58) Field of Classification Search
CPC ...... F03D 7/045; F03D 7/049; F05B 2260/84; F05B 2270/204; F05B 2270/321
See application file for complete search history.

(56) References Cited

U.S. PATENT DOCUMENTS

| | | | |
|---|---|---|---|
| 9,995,278 B2 | 6/2018 | Lund et al. | |
| 10,247,171 B2 | 4/2019 | Petitjean et al. | |
| 11,536,249 B2 | 12/2022 | Gebraad | |
| 2016/0146190 A1* | 5/2016 | Ravindra | F03D 9/257 290/44 |
| 2017/0022974 A1* | 1/2017 | Roma | F03D 9/257 |
| 2017/0356421 A1* | 12/2017 | Petitjean | G05B 19/042 |

\* cited by examiner

*Primary Examiner* — Sean Gugger
(74) *Attorney, Agent, or Firm* — True Shepherd LLC; Andrew C. Cheng

(57) ABSTRACT

The present disclosure relates to a wind farm layout and yaw control method, and an electronic device. The wind farm layout and yaw control method comprises the following steps: acquiring wind farm data, importing the wind farm data into a WFSim model for simulation, obtaining original power data of the wind farm, counting and recording modifiable wind farm layout and yaw parameters, adjusting variable parameters to be changed, using the WFSim model for simulation to obtain an optimal parameter range of different variables and combining the optimal parameters to obtain an optimal working condition, and using the WFSim model for simulation to obtain optimal power data. The wind farm layout and yaw control method according to the present disclosure is based on optimizing the power output of the wind farm, so that it is very convenient to acquired information. Meanwhile, a WFSim two-dimensional fidelity model is used to simulate and solve the wind farm, so that the simulation time can be reduced while ensuring data accuracy.

9 Claims, 4 Drawing Sheets

WIND FARM LAYOUT AND YAW CONTROL METHOD AND ELECTRONIC DEVICE

CROSS-REFERENCE TO RELATED APPLICATIONS

This application claims priority to Chinese Patent Application No. 202211615132.6 with a filing date of Dec. 15, 2022. The content of the aforementioned application, including any intervening amendments thereto, is incorporated herein by reference.

TECHNICAL FIELD

The present disclosure relates to the technical field of wind power, in particular to a wind farm layout and yaw control method and an electronic device.

BACKGROUND

Wind energy is a type of clean and renewable energy. Improving the development speed of new energy resources such as wind energy can reduce carbon emissions and prevent energy crisis to some extent. The wake effect of wind turbines leads to a certain loss of power generation in wind farms, which usually accounts for 10% to 20% of the annual power generation. At the same time, due to the high turbulence intensity in the wake region, the incoming wind speed of a downstream wind turbine decreases, and the fatigue load of the downstream wind turbine increases, so as to reduce the power generation of the wind farm and the lifetime of the blades and towers. Therefore, layout optimization in the development and design stage of the wind farm is the key technology to minimize the influence of wake flow in the wind farm, which directly determines the power generation after the wind farm is put into operation and then affects the economic benefits of the whole life cycle.

Many factors need to be considered in the optimization of the wind farm layout. Most of these factors are nonlinear, which leads to the complexity of the optimization of the wind farm layout and the difficulty in ensuring its accuracy. Therefore, there is an urgent need for a fast, efficient and accurate method for optimizing the wind farm layout.

SUMMARY

The present disclosure aims to provide a wind farm layout and yaw control method and an electronic device, so as to reduce the influence of the wake effect, reduce the load of a wind turbine and improve the power output of the wind farm.

In order to achieve the above purpose, the present disclosure provides the following technical scheme: a wind farm layout and yaw control method, comprising the following steps:

acquiring wind farm data;
importing the wind farm data into a WFSim model for simulation to obtain original power data of the wind farm;
counting and recording variables with modifiable parameters for wind farm layout and yaw;
adjusting the modifiable parameters of the variables, and using the WFSim model for simulation to obtain an influence trend of change in value of the variables on wind farm power, and obtain optimal parameter ranges of the variables respectively;
combining optimal parameters of the variables to obtain an optimal working condition, and using the WFSim model for simulation again to obtain an optimal power data;
determining whether the optimal working condition is applicable to the wind farm.

As a preferred scheme, the wind farm data comprises wind turbine parameters, wind turbine position information, wind resource information, atmospheric conditions and wind turbine yaw setting information.

As a preferred scheme, the wind turbine parameters comprise an impeller diameter D, a hub height H and a thrust coefficient curve.

As a preferred scheme, the wind turbine yaw setting information comprises a yaw rate, a yaw angle and a yaw wind turbine position.

As a preferred scheme, the variable parameters to be changed are adjusted, orthogonal tests are conducted according to the parameters, and the WFSim model is used for simulation.

As a preferred scheme, the WFSim model is based on a modified two-dimensional Navier-Stokes equation and a Prandtl mixing-length model, the modified two-dimensional Navier-Stokes equation is:

$$\frac{\partial u}{\partial t} + (u \cdot \nabla_H)u + \nabla_H \cdot \tau_H + \nabla_H p - f = 0$$

$$\nabla_H \cdot u = -\frac{\partial v}{\partial y}$$

The Prandtl mixing-length model is:

$$\tau_H = -\frac{1}{2}v_t(\nabla_H u + (\nabla_H u)^T)$$

$$v_t = l_u(x,y)^2 \left|\frac{\partial u}{\partial y}\right|$$

wherein $u=(u\ v)^T$ indicates an incoming wind speed of the wind turbine, $\partial$ indicates a partial derivative, $\partial u/\partial t$ indicates the partial derivative of the wind speed with respect to time as a whole, u and v indicate the wind speed in x and y directions, respectively, $\partial v/\partial y$ indicates the partial derivative of v with respect to y, t indicates time, T is a matrix transpose symbol; $\nabla_H(\partial/\partial x, \partial/\partial y)^T$; p indicates a pressure field, f indicates the influence of the wind turbine on flow; $\nabla_H U$ indicates a two-dimensional rate of a strain tensor, $v_t$ indicates an eddy viscosity, and $l_u(x,y)$ indicates a mixing length.

As a preferred scheme, the mixing length is parameterized as:

$$l_u(x,y)=G(x_n',y_n')*l_u^n(x_n',y_n')$$

$$l_u^n(x_n',y_n')=(x_n'-d')l_s,$$

wherein n indicates the nth wind turbine, G(x,y) indicates a spherical box filter with a radius of 3, * is a two-dimensional convolution operator, $x_n'$ and $y_n'$ are defined as the average wind direction which are constrained by $x_n'=\{x_n': d'\leq x_n'\leq d\}$ and $y_n'=\{y_n':y_n'|\leq D\}$, $|\varphi|\leq 45$ is set, d is constrained by cos$(\varphi)d\leq |x_q-x_n|$, where d and d' are all artificially set variables in the model, D indicates the diameter of a rotor of the wind turbine, $x_n$ is the x coordinate of the wind turbine, $x_q$ is the x coordinate of the downstream wind turbine, $l_u^n(x_n',y_n')$ is regarded as the local mixing length of the wind turbine n, and φ is the included angle between the average wind direction and the x axis.

As a preferred scheme, the wind turbine is modeled by an actuator disk model and is driven by yaw and axial induction.

As a preferred scheme, in the WFSim model, the equation for power calculating is:

$$P = \sum_{n=1}^{N} \frac{1}{2}\rho A C_{P_n}[u_n \cos(\gamma_n)]^3$$

wherein A indicates an area of the rotor, ρ indicates an air density, $C_{P_n}$ indicates a power coefficient, and N indicates the total number of the wind turbines.

The present disclosure further provides an electronic device, comprising at least one processor and a memory in which processor-executable instructions are storing, wherein the instructions, when executed by the processor, implement the wind farm layout and yaw control method according to any of the schemes.

Compared with the prior art, the present disclosure has the following beneficial effects. According to the wind farm layout and yaw control method provided by the present disclosure, the wake effect is effectively reduced, the load of the wind turbine is reduced, the power output of the wind farm is improved, and the following beneficial effects are also included:

1) The wind farm layout and yaw control method according to the present disclosure is based on optimizing the power output of the wind farm, so that it is very convenient to acquired information. Only wind farm position data, wind resource data, atmospheric condition data, yaw control data and wind turbine parameter data need to be acquired. Compared with the traditional method for optimizing the wind farm layout, the present disclosure requires less data processing time.

2) According to the present disclosure, a WFSim two-dimensional fidelity model is used to simulate and solve the wind farm, so that the simulation time can be reduced while ensuring data accuracy.

3) According to the present disclosure, by introducing an orthogonal test method, the simulation time can be greatly shortened, and the appropriate wind turbine position and yaw method can be quickly obtained.

DETAILED DESCRIPTION OF THE EMBODIMENTS

Figure 1:
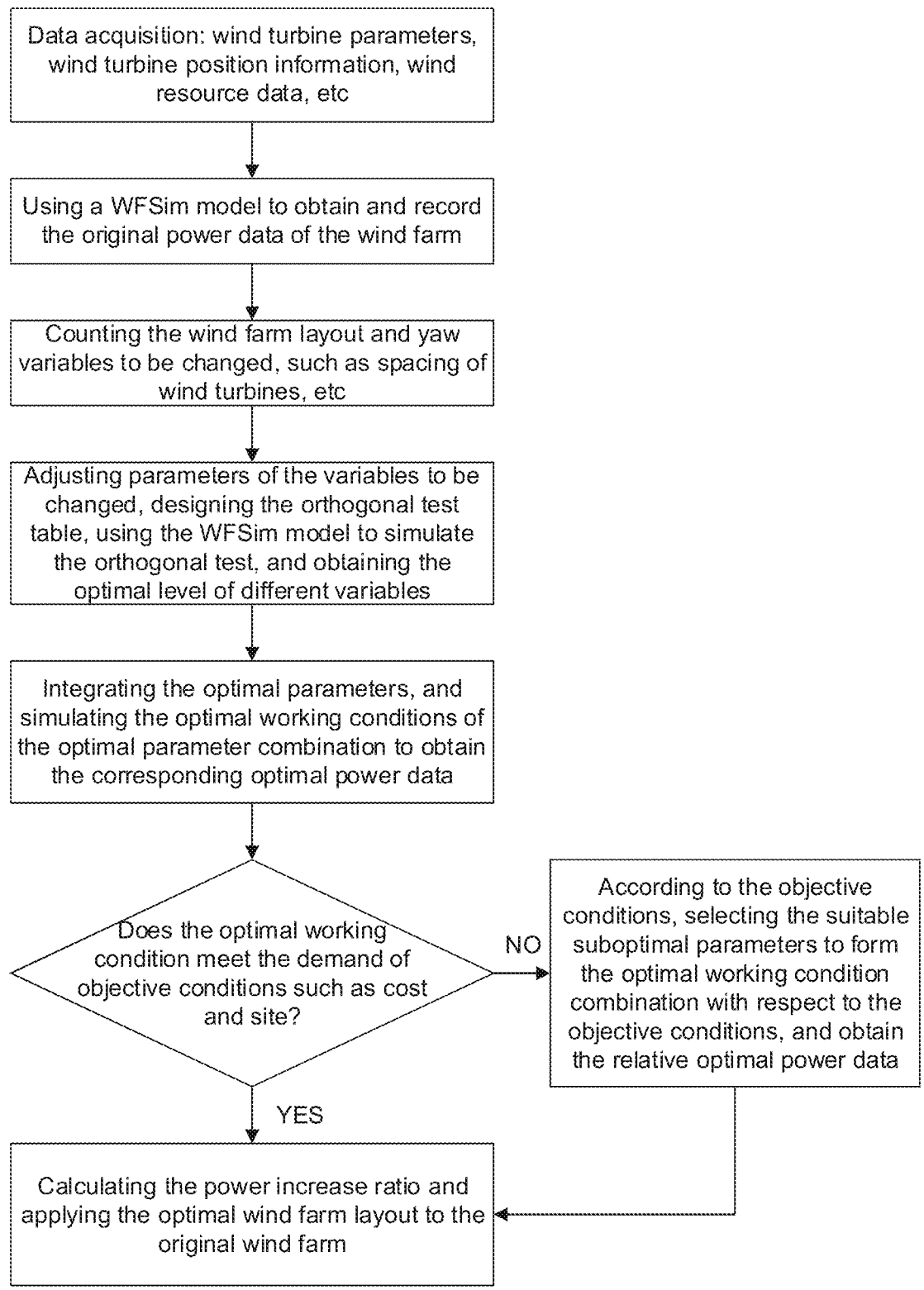
FIG. 1 is a schematic flow chart showing a wind farm layout and yaw control method according to the present disclosure.

The technical scheme in the embodiment of the present disclosure will be clearly and completely described hereinafter with reference to the attached drawings. Obviously, the described embodiments are only part of the embodiments of the present disclosure, rather than all of the embodiments. Based on the embodiment of the present disclosure, all other embodiments obtained by those skilled in the art without any creative effort belong to the scope of protection of the present disclosure.

In the description of the present disclosure, it should be noted that the orientation or position relationships indicated by the terms described herein such as "center", "longitudinal", "transverse", "length", "width", "thickness", "up", "down", "front", "back", "left", "right", "vertical", "horizontal", "top", "bottom", "inside", "outside" are based on the orientation or position relationships shown in the drawings only for the convenience of describing the present disclosure and simplifying the description, rather than indicate or imply that the referred devices or elements must have a specific orientation, be constructed and operated in a specific orientation, and therefore should not be construed as limiting the present disclosure.

As shown in FIG. 1, the present disclosure discloses a wind farm layout and yaw control method based on optimizing the power output of a wind farm, which comprises the following steps.

In step 1, the current original data of the wind farm is acquired. The wind farm data comprises wind turbine parameters, wind turbine position information, wind resource information, atmospheric conditions and wind turbine yaw setting information. The wind turbine parameters comprise but are not limited to: an impeller diameter D, a hub height H and a thrust coefficient curve. The wind turbine yaw setting information comprises but is not limited to: a yaw rate, a yaw angle and a yaw wind turbine position;

In step 2, the obtained original data of the wind farm is imported into a WFSim model for simulation to obtain and record original power data of the wind farm.

In step 3, the variables with modifiable parameters for wind farm layout and yaw are counted and recorded.

In step 4, the modifiable parameters of the variables are adjusted. An orthogonal test table is designed. The WFSim model is used for orthogonal test simulation to obtain the influence trend of variable numerical change on wind farm power, and obtain an optimal parameter range of different variables.

Because there are many variables involved in the optimization of the wind turbine layout, a large number of tests are required to study all working conditions of various variables, which is up to thousands of times. By introducing the orthogonal test method, the simulation time can be greatly shortened, and the suitable wind turbine position and yaw method can be quickly obtained.

In step 5, the optimal parameters of the variables are combined to obtain an optimal working condition, and the WFSim model is used for simulation again to obtain optimal power data.

It should be pointed out that most of the models used in the traditional method for optimizing the wind farm layout are three-dimensional models, in which the simulation time is greatly prolonged compared with two-dimensional models. However, most of the wind turbines in offshore wind farms are at the same horizontal line. Therefore, a WFSim two-dimensional fidelity model is used to simulate and solve the wind farm, so that the simulation time can be reduced while ensuring data accuracy.

In step 6, according to objective reasons such as cost and site, it is determined whether the optimal working condition combination meets the actual demand. If so, the obtained optimal data can be applied to the original wind farm. If not, the optimal working condition combination with respect to objective conditions is selected according to the influence trend of variables obtained from the test on the wind farm power, and then is applied to the original wind farm to achieve the optimization purpose.

Various model information mentioned in the above method is introduced as follows.

1. A WFSim model uses a dynamic wind farm model based on a modified two-dimensional Navier-Stokes equation and a Prandtl mixing-length model, which is referred to as WindFarmSimulator (WFSim). The two-dimensional N-S equation partially modifies the neglected vertical dimension.

The two-dimensional N-S equation is:

$$\frac{\partial u}{\partial t} + (u \cdot \nabla_H)u + \nabla_H \cdot \tau_H + \nabla_H p - f = 0$$

$$\nabla_H \cdot u = -\frac{\partial v}{\partial y}$$

where $u=(u\ v)^T$ indicates an incoming wind speed of the wind turbine, $\partial$ indicates a partial derivative, $\partial u/\partial t$ indicates the partial derivative of the wind speed with respect to time as a whole, u and v indicate the wind speed in x and y directions, respectively, $\partial v/\partial y$ indicates the partial derivative of v with respect to y, t indicates time, T is a matrix transpose symbol; $\nabla_H(\partial/\partial x, \partial/\partial y)^T$; p indicates a pressure field, f indicates the influence of the wind turbine on flow, $\tau_H$ is Prandtl mixing-length model, which is expressed as:

$$\tau_H = -\frac{1}{2}v_t\left(\nabla_H u + (\nabla_H u)^T\right)$$

$$v_t = l_u(x, y)^2 \left|\frac{\partial u}{\partial y}\right|$$

where $\partial/\partial x, \partial/\partial y) \cdot u=(\partial u/\partial x, \partial u/\partial y)$ indicates the matrix consisted of the partial derivative of the wind speed u with respect to x and the partial derivative of the wind speed with respect to y, $\nabla_H U$ indicates a two-dimensional rate of a strain tensor, $v_t$ indicates an eddy viscosity, and $l_u(x,y)$ indicates a mixing length. Each line segment has its own ($x_n'$, $y_n'$) coordinate system, which is located in the global (x,y) coordinate system. The mixing length is parameterized as:

$$l_u(x,y)=G(x_n',y_n')*l_u^n(x_n',y_n')$$

$$l_u^n(x_n',y_n')=(x_n'-d')l_s,$$

where n indicates the nth wind turbine, G(x,y) indicates a (smooth) spherical box filter with a radius of 3, * is a two-dimensional convolution operator, $x_n'$ and $y_n'$ are defined as the average wind direction which are constrained by $x_n'=\{x_n':d'\leq x_n'\leq d\}$ and $y_n'=\{y_n':|y_n'|\leq D\}$. In addition, $|\varphi|\leq 45$ is set, and d is constrained by $\cos(\varphi)d\leq|x_q-x_n|$, where d and d' are all artificially set variables in the model, and D indicates the diameter of a rotor of the wind turbine. $x_n$ is the x coordinate of the wind turbine, $x_q$ is the x coordinate of the downstream wind turbine, $l_u^n(x_n',y_n')$ is regarded as the local mixing length of the wind turbine n, and $\varphi$ is the included angle between the average wind direction and the x axis.

To sum up, when adjusting the turbulence model, only the three adjustment variables $l_s$, d and d' need to be adjusted, which reduces the complexity of operation. $l_s$ is the tuning parameter, which defines the slope of the local mixing length parameter.

2. A non-rotating Actuator Disk Model (ADM) of a wind turbine: in this method, each wind turbine is modeled by an ADM and is driven by yaw and axial induction. Using this model, the influence exerted by the wind turbine is expressed as:

$$f = \sum_{n=1}^{n} \frac{C_f}{2} C_{T_n}' [u_n\cos(\gamma_n)]^2 \binom{\cos(\gamma_n+\varphi)}{\sin(\gamma_n+\varphi)} \times H\left[\frac{D}{2} - \|s-t_n\|_2\right]\delta[(s-t_n)\cdot e_{\perp,n}]$$

where $c_f$ is regarded as a variable in the model, $u_n$ is the incoming wind speed of the wind turbine mentioned above, $\gamma_n$ is the deflection angle, $\varphi$ is the included angle between the average wind direction and the x axis, s is a set matrix, $s=(x,y)^T$ indicates the coordinates of the wind turbine, D indicates the diameter of the wind turbine; H[•] indicates the Heaviside function, $\delta$[•] indicates the Dirac $\delta$ function, and $e_{\perp,n}$ is the unit vector perpendicular to the nth rotor disk with position $t_n$. $C_{T_n}'$ is the thrust coefficient of the disk, which can be expressed by the following relationship:

$$C_{T_n}'=C_{T_n}/(1-a_n)^2$$

where $a_n$ is the axial induction coefficient of the nth wind turbine, and the thrust coefficient $C_{T_n}'$ based on the disk can be expressed by the classical thrust coefficient $C_{T_n}$. In the WFSim model, $C_{T_n}'$ and $\gamma_n$ are regarded as control variables, which can be used to adjust the wake, thus adjusting the performance of the wind farm.

3. A power calculation model: in the WFSim model, the equation for power calculating is:

$$P = \sum_{n=1}^{N} \frac{1}{2}\rho A C_{P_n} [u_n\cos(\gamma_n)]^3$$

where A indicates an area of the rotor, $\rho$ indicates an air density, $C_{P_n}$ indicates a power coefficient, and N indicates the total number of the wind turbines.

4. A yaw rate determining method: this method comprises determining the optimal yaw rate of the wind turbine in the aspect of yaw control, and the yaw rate determining method is specified as follows:

$$\omega=\gamma/t$$

where $\omega$ is the yaw rate, $\gamma$ is the yaw angle, and t is the time spent in the yaw process of the wind turbine.

Figure 2:
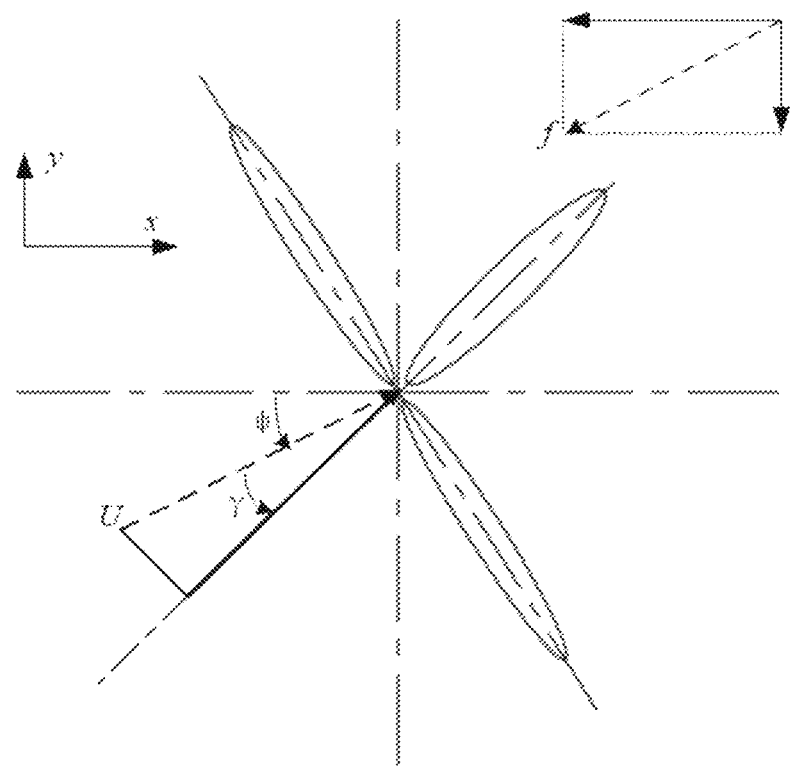
FIG. 2 is a schematic diagram showing a non-rotating actuator disk model of a wind turbine according to the present disclosure.

Refer to FIG. 2 for the non-rotating ADM of the wind turbine, where U indicates the incoming wind speed, $\gamma$ indicates the yaw angle, $\varphi$ indicates the included angle between the wind speed and the x axis, and f indicates the influence exerted by the wind turbine.

For the convenience of understanding, the present disclosure will be further explained in detail in conjunction with embodiments. It should also be understood that the following embodiments are only used for further explanation of the present disclosure, and cannot be understood as limiting the scope of protection of the present disclosure. Some non-essential improvements and adjustments made by those skilled in the art according to the above contents of the present disclosure belong to the scope of protection of the present disclosure.

Figure 3:
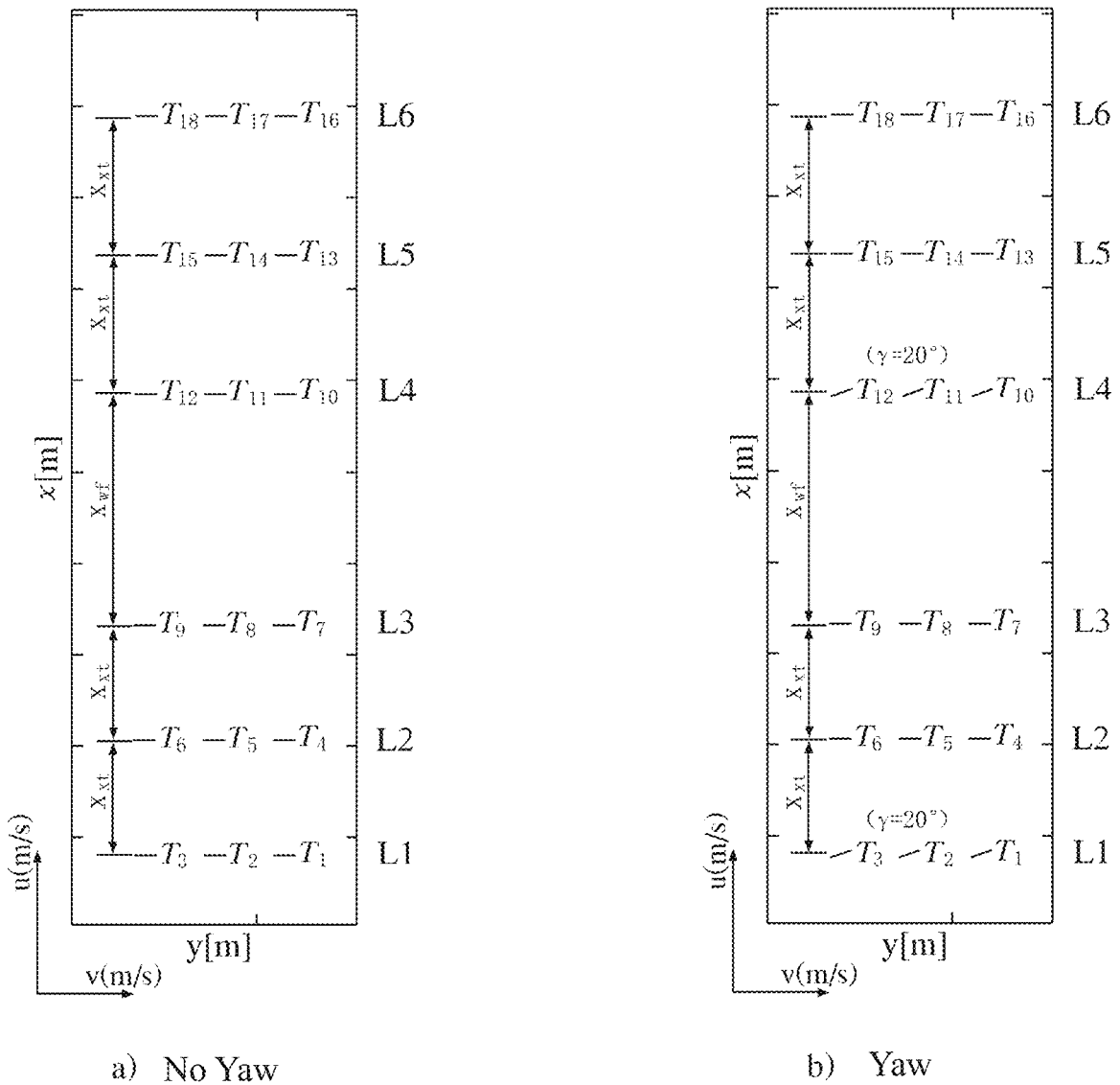
FIG. 3 is a layout diagram showing a wind farm according to an embodiment of the present disclosure.

In this embodiment, a large wind farm consisting of 18 wind turbines is constructed, which further consists of two small wind farms. Refer to FIG. 3 for layout of wind farm.

In this embodiment, the used wind turbine is the NREL 5 MW wind turbine, in which the basic layout and yaw are $x_{xt}=6.0D$, $x_{wf}=12.0D$, $\gamma=20°$, $\omega=0.0122$ rad/s, and $n=L1+L4$. $x_{xt}$ indicates the longitudinal spacing of wind turbines in the prevailing wind direction, $x_{wf}$ indicates the spacing of wind farms, $\gamma$ indicates the yaw angle, $\omega$ indicates the yaw rate, n indicates the yaw wind turbine position, and D indicates the diameter of a rotor of the wind turbine. Other variables will not be changed in this example. The WFSim model is used for simulation to obtain the average power data of 31.129 MW. Then, the variables are changed, the orthogonal test table is designed, and orthogonal test is carried out to explore the influence of the variables on the average power output of the wind farm. See Table 1 for orthogonal test parameters.

TABLE 1

Orthogonal Test Parameter Settings

|   | A ($x_{xt}$) | B ($x_{wf}$) | C ($\gamma$) [°] | D ($\omega$) [rad/s] | E (n) | F (empty column) |
|---|---|---|---|---|---|---|
| 1 | 4.5 D | 9.0 D | 5 | 0.00698 | L1 L2 | |
| 2 | 5.0 D | 10.0 D | 10 | 0.00873 | L1 L4 | |
| 3 | 5.5 D | 11.0 D | 15 | 0.0105 | L1 L5 | |
| 4 | 6.0 D | 12.0 D | 20 | 0.0122 | L2 L4 | |
| 5 | 6.5 D | 13.0 D | 25 | 0.014 | L2 L5 | |
| 6 | 7.0 D | 14.0 D | 30 | 0.0157 | L3 L4 | |
| 7 | 7.5 D | 15.0 D | 35 | 0.0175 | L3 L5 | |

Based on the existing technology, the longitudinal spacing of wind turbines should be in the range of 3-8D, and the spacing of wind farms should be greater than the longitudinal spacing of wind turbines. Therefore, the research scope of the longitudinal spacing of wind turbines is 4.5D-7.5D, and the research scope of the spacing of wind farms is 9D-12D. When the yaw angle exceeds 35 degrees, the wind speed received by the wind turbine will be greatly reduced, and the load of the wind turbine will be increased, which will have a great impact on the average power output of the wind farm and the life of the wind turbine. Therefore, the range of 5-35 degrees is selected for research. The yaw rate of 0.00698-0.0175 rad/s corresponds to the deflection of the wind turbine of 0.4-1.0 degrees per second. Too small yaw rate will lead to the increase of the yaw time, so that the reduction of the wake effect by the yaw reaches the downstream wind turbine later. However, too large yaw rate will increase the horizontal force of the wind turbine, thus affecting the life of the wind turbine. Therefore, the range of the yaw rate of 0.00698-0.0175 rad/s is selected for research.

According to the parameter settings, the orthogonal test results are shown in

TABLE 2

Orthogonal test results

| No. | A Longitudinal spacing of wind turbines | B Spacing of wind farms | C Yaw angle (°) | D Yaw rate (rad/s) | E Yaw position of wind farms | F Blank position | Average power (MW) |
|---|---|---|---|---|---|---|---|
| 1 | 1 | 1 | 1 | 1 | 1 | 1 | 30.100 |
| 2 | 1 | 2 | 3 | 4 | 5 | 6 | 30.693 |
| 3 | 1 | 3 | 5 | 7 | 2 | 4 | 32.942 |
| 4 | 1 | 4 | 7 | 3 | 6 | 2 | 31.670 |
| 5 | 1 | 5 | 2 | 6 | 3 | 7 | 31.438 |
| 6 | 1 | 6 | 4 | 2 | 7 | 5 | 31.691 |
| 7 | 1 | 7 | 6 | 5 | 4 | 3 | 32.926 |
| 8 | 2 | 1 | 7 | 6 | 5 | 4 | 30.533 |
| 9 | 2 | 2 | 2 | 2 | 2 | 2 | 30.639 |
| 10 | 2 | 3 | 4 | 5 | 6 | 7 | 31.095 |
| 11 | 2 | 4 | 6 | 1 | 3 | 5 | 32.988 |
| 12 | 2 | 5 | 1 | 4 | 7 | 3 | 31.168 |
| 13 | 2 | 6 | 3 | 7 | 4 | 1 | 31.886 |
| 14 | 2 | 7 | 5 | 3 | 1 | 6 | 35.140 |
| 15 | 3 | 1 | 6 | 4 | 2 | 7 | 32.659 |
| 16 | 3 | 2 | 1 | 7 | 6 | 5 | 30.287 |
| 17 | 3 | 3 | 3 | 3 | 3 | 3 | 31.499 |
| 18 | 3 | 4 | 5 | 6 | 7 | 1 | 31.377 |
| 19 | 3 | 5 | 7 | 2 | 4 | 6 | 32.416 |
| 20 | 3 | 6 | 2 | 5 | 1 | 4 | 32.211 |
| 21 | 3 | 7 | 4 | 1 | 5 | 2 | 31.978 |
| 22 | 4 | 1 | 5 | 2 | 6 | 3 | 30.667 |
| 23 | 4 | 2 | 7 | 5 | 3 | 1 | 32.821 |
| 24 | 4 | 3 | 2 | 1 | 7 | 6 | 30.823 |
| 25 | 4 | 4 | 4 | 4 | 4 | 4 | 31.837 |
| 26 | 4 | 5 | 6 | 7 | 1 | 2 | 34.703 |
| 27 | 4 | 6 | 1 | 3 | 5 | 7 | 31.443 |
| 28 | 4 | 7 | 3 | 6 | 2 | 5 | 30.188 |
| 29 | 5 | 1 | 4 | 7 | 3 | 6 | 31.755 |
| 30 | 5 | 2 | 6 | 3 | 7 | 4 | 31.209 |
| 31 | 5 | 3 | 1 | 6 | 4 | 2 | 30.981 |
| 32 | 5 | 4 | 3 | 2 | 1 | 7 | 33.104 |
| 33 | 5 | 5 | 5 | 5 | 5 | 5 | 31.983 |
| 34 | 5 | 6 | 7 | 1 | 2 | 3 | 33.760 |

TABLE 2-continued

Orthogonal test results

| No. | A Longitudinal spacing of wind turbines | B Spacing of wind farms | C Yaw angle (°) | D Yaw rate (rad/s) | E Yaw position of wind farms | F Blank position | Average power (MW) |
|---|---|---|---|---|---|---|---|
| 35 | 5 | 7 | 2 | 4 | 6 | 1 | 32.281 |
| 36 | 6 | 1 | 3 | 5 | 7 | 2 | 30.909 |
| 37 | 6 | 2 | 5 | 1 | 4 | 7 | 32.123 |
| 38 | 6 | 3 | 7 | 4 | 1 | 5 | 34.225 |
| 39 | 6 | 4 | 2 | 7 | 5 | 3 | 31.434 |
| 40 | 6 | 5 | 4 | 3 | 2 | 1 | 33.114 |
| 41 | 6 | 6 | 6 | 6 | 6 | 6 | 32.988 |
| 42 | 6 | 7 | 1 | 2 | 3 | 4 | 32.275 |
| 43 | 7 | 1 | 2 | 3 | 4 | 5 | 30.957 |
| 44 | 7 | 2 | 4 | 6 | 1 | 3 | 33.625 |
| 45 | 7 | 3 | 6 | 2 | 5 | 1 | 31.909 |
| 46 | 7 | 4 | 1 | 5 | 2 | 6 | 31.329 |
| 47 | 7 | 5 | 3 | 1 | 6 | 4 | 32.119 |
| 48 | 7 | 6 | 5 | 4 | 3 | 2 | 33.145 |
| 49 | 7 | 7 | 7 | 7 | 7 | 7 | 32.438 |

Figure 4:
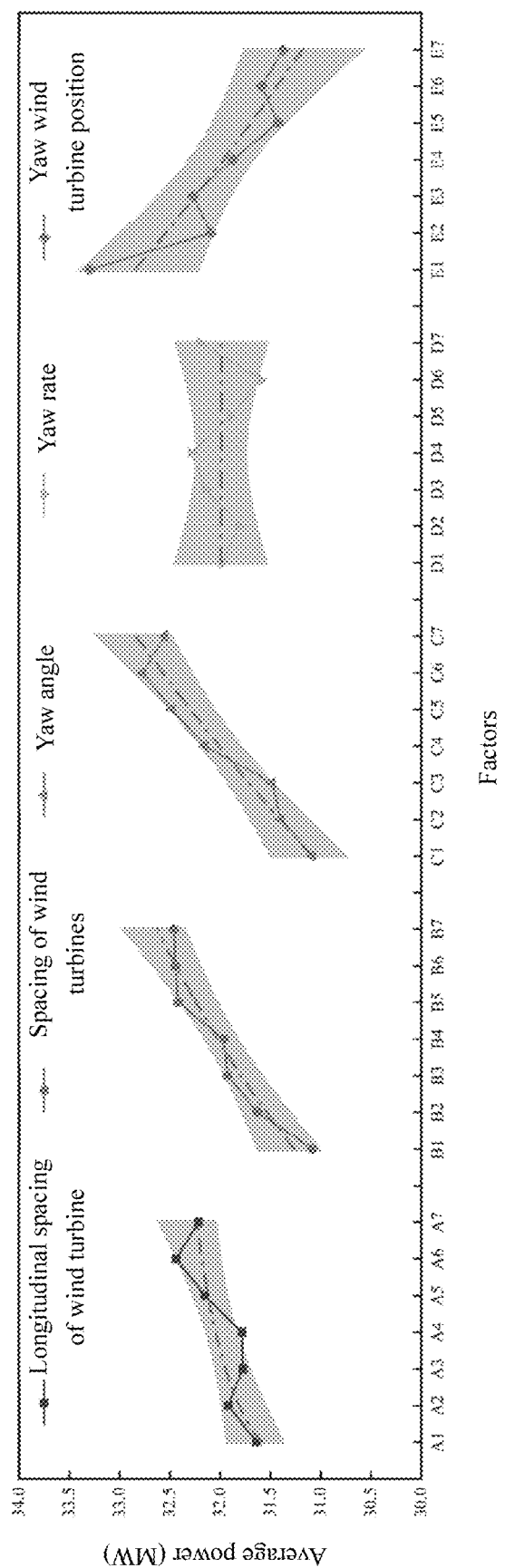
FIG. 4 shows the average power distribution of a wind farm under different parameters according to an embodiment of the present disclosure.

According to the above orthogonal test results, the influence of each variable on the average power output of the wind farm as shown in FIG. 4 is obtained.

According to FIG. 4, almost all the obtained data are within the confidence band, which further verifies the accuracy of this method. In this case, the optimal variable parameters are $x_{xt}$=7.0D, $x_{wf}$=15.0D, γ=30, ω=0.0122 rad/s, n=L1+L2. The WFSim model is used to simulate the optimal working condition combination to obtain the average power data of 35.188 MW, which is 13.05 MW higher than that of the original wind farm layout and yaw setting.

Because the optimal working condition combination increases the distance by 7.0D in the longitudinal direction compared with the original wind farm layout, it may lead to the target wind farm layout exceeding the expected range of the wind farm. In this case, the parameters can be further adjusted according to FIG. 4, so as to achieve the wind farm layout and yaw setting that meet the expected target.

The basic principle, main features and advantages of the present disclosure have been shown and described above. It should be understood by those skilled in the art that the present disclosure is not limited by the above embodiments. The embodiments and the specification only describe preferred embodiments of the present disclosure, rather than limit the present disclosure. Without departing from the spirit and scope of the present disclosure, there will be various changes and improvements in the present disclosure, which fall within the protection scope of the present disclosure. The protection scope of the present disclosure is defined by the appended claims and their equivalents.

What is claimed is:

1. A wind farm layout and yaw control method, comprising the following steps:
acquiring wind farm data;
importing the wind farm data into a wind farm model for simulation to obtain original power data of the wind farm;
counting and recording variables with modifiable parameters for wind farm layout and yaw;
adjusting the modifiable parameters of the variables, and using the wind farm model for simulation to obtain an influence trend of change in value of the variables on wind farm power, and obtain optimal parameter ranges for the variables respectively;
combining optimal parameters of the variables to obtain an optimal working condition, and using the wind farm model for simulation again to obtain an optimal power data;
determining whether the optimal working condition is applicable to the wind farm;
wherein the wind farm model is based on a modified two-dimensional Navier-Stokes equation and a Prandtl mixing-length model,
the modified two-dimensional Navier-Stokes equation is:

$$\frac{\partial u}{\partial t} + (u \cdot \nabla_H)u + \nabla_H \cdot \tau_H + \nabla_H p - f = 0$$

$$\nabla_H \cdot u = -\frac{\partial v}{\partial y}$$

the Prandtl mixing-length model is:

$$\tau_H = -\frac{1}{2}v_t(\nabla_H u + (\nabla_H u)^T)$$

$$v_t = l_u(x, y)^2 \left|\frac{\partial u}{\partial y}\right|$$

μ=(uv)$^t$ indicates an incoming wind speed of the wind turbine, ∂ indicates a partial derivative, ∂u/∂t indicates the partial derivative of the wind speed with respect to time as a whole, u and v indicate the wind speed in x and y directions, respectively, ∂v/∂v indicates the partial derivative of v with respect to y, t indicates time, T is a matrix transpose symbol; $\nabla_H$=(∂/∂x, ∂/∂y)$^T$; p indicates a pressure field, f indicates the influence of the wind turbine on flow;

$\nabla_H u$ indicates a two-dimensional rate of a strain tensor, $v_t$ indicates an eddy viscosity, and $l_u(x,y)$ indicates a mixing length.

2. The wind farm layout and yaw control method according to claim 1, wherein the wind farm data comprises wind turbine parameters, wind turbine position information, wind resource information, atmospheric conditions and wind turbine yaw setting information.

3. The wind farm layout and yaw control method according to claim 2, wherein the wind turbine parameters comprise an impeller diameter D, a hub height H and a thrust coefficient curve.

4. The wind farm layout and yaw control method according to claim 2, wherein the wind turbine yaw setting information comprises a yaw rate, a yaw angle and a yaw wind turbine position.

5. The wind farm layout and yaw control method according to claim 1, wherein the variable parameters to be changed are adjusted, orthogonal tests are conducted according to the parameters, and the wind farm model is used for simulation.

6. The wind farm layout and yaw control method according to claim 1, wherein the mixing length is parameterized as:

$$l_u(x,y) = G(x_n',y_n') * l_u^n(x_n',y_n')$$

$$l_u^n(x_n',y_n') = (x_n' - d')l_s,$$

n indicates the nth wind turbine, G(x,y) indicates a spherical box filter with a radius of 3, * is a two-dimensional convolution operator, $x_n'$ and $y_n'$ are defined as the average wind direction which are constrained by $x_n' = \{x_n': d' \leq x_n' \leq d\}$ and $y_n' = \{y_n': |y_n'| \leq D\}$, $|\varphi| \leq 45$ is set, d is constrained by $\cos(\varphi)d \leq |x_q - x_n|$, where d and d' are all artificially set variables in the model, D indicates the diameter of a rotor of the wind turbine, $x_n$ is the x coordinate of the wind turbine, $x_q$ is the x coordinate of the downstream wind turbine, $l_u^n(x_n',y_n')$ is regarded as the local mixing length of the wind turbine n, and $\varphi$ is the included angle between the average wind direction and the x axis.

7. The wind farm layout and yaw control method according to claim 1, wherein the wind turbine is modeled by an actuator disk model and is driven by yaw and axial induction.

8. The wind farm layout and yaw control method according to claim 1, wherein in the wind farm model, the equation for power calculating is:

$$P = \sum_{n=1}^{N} \frac{1}{2} \rho A C_{P_n} [u_n \cos(\gamma_n)]^3$$

A indicates an area of the rotor, $\rho$ indicates an air density, $C_{P_n}$ indicates a power coefficient, and N indicates the total number of the wind turbines.

9. An electronic device, comprising at least one processor and a memory for storing processor-executable instructions, wherein the instructions, when executed by the processor, implement the wind farm layout and yaw control method according to claim 1.

* * * * *